(No Model.)

G. W. FARRELL.
VEHICLE SPRING.

No. 389,923. Patented Sept. 25, 1888.

ATTEST.
J. Henry Kaiser
James H. Smith

George W. Farrell
INVENTOR.
By J. N. Wade
Attorney

UNITED STATES PATENT OFFICE.

GEORGE W. FARRELL, OF AU SABLE FORKS, NEW YORK.

VEHICLE-SPRING.

SPECIFICATION forming part of Letters Patent No. 389,923, dated September 25, 1888.

Application filed May 11, 1888. Serial No. 273,617. (No model.)

*To all whom it may concern:*

Be it known that I, GEORGE W. FARRELL, a citizen of the United States of America, residing at Au Sable Forks, in the county of Essex and State of New York, have invented certain new and useful Improvements in Vehicle-Springs, of which the following is a specification, reference being had therein to the accompanying drawings.

My invention relates to an improvement in buckboard-springs.

Figure 1:
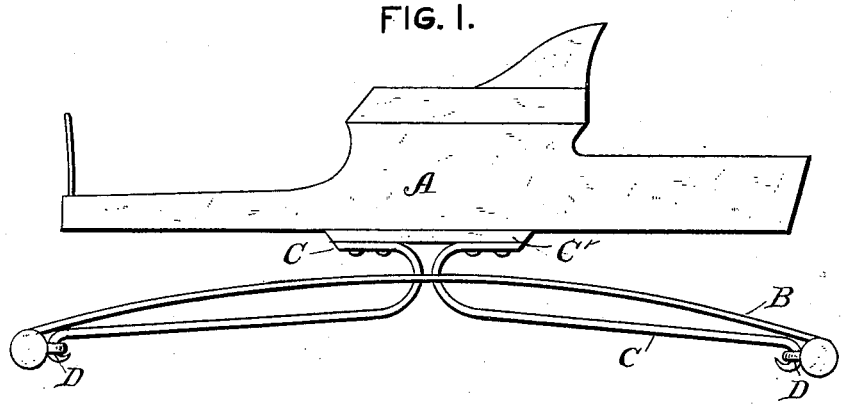
Figure 2:
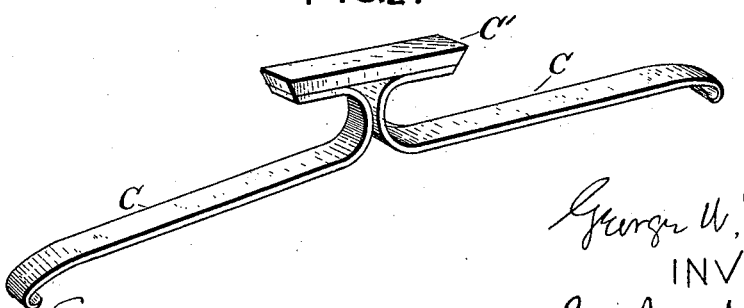

Figure 1 is a side elevation of the body of a buckboard with spring attached. Fig. 2 is a perspective view of the spring C C detached from the board.

Similar letters refer to similar parts throughout both views.

In Fig. 1, A represents the body of an ordinary buckboard; B, the spring-board, having an upward curve extending from axle to axle; C C, the spring, fastened to the axle at D and rigidly fixed to the plate C', upon which the box or body A rests. The spring C C and plate C' may be formed in a single piece. The springs C C at or near the return-bend work through a slot in the spring-board B. (Not shown in the drawings.) Pressure upon the body A forces the axles apart and draws down the spring-board B, communicating to the body A the double action of the spring-board B and springs C C, thus resulting in an easy and delightful vehicle for the purpose of conveyance.

What I claim as new, and desire to secure by Letters Patent, is—

The combination of the within-described spring C C, the plate C', and the spring-board B, as and for the purposes described.

In testimony whereof I affix my signature in presence of two witnesses.

GEORGE W. FARRELL.

Witnesses:
T. D. TRUMBULL, Jr.,
WILLIAM M. WESTON.